UNITED STATES PATENT OFFICE.

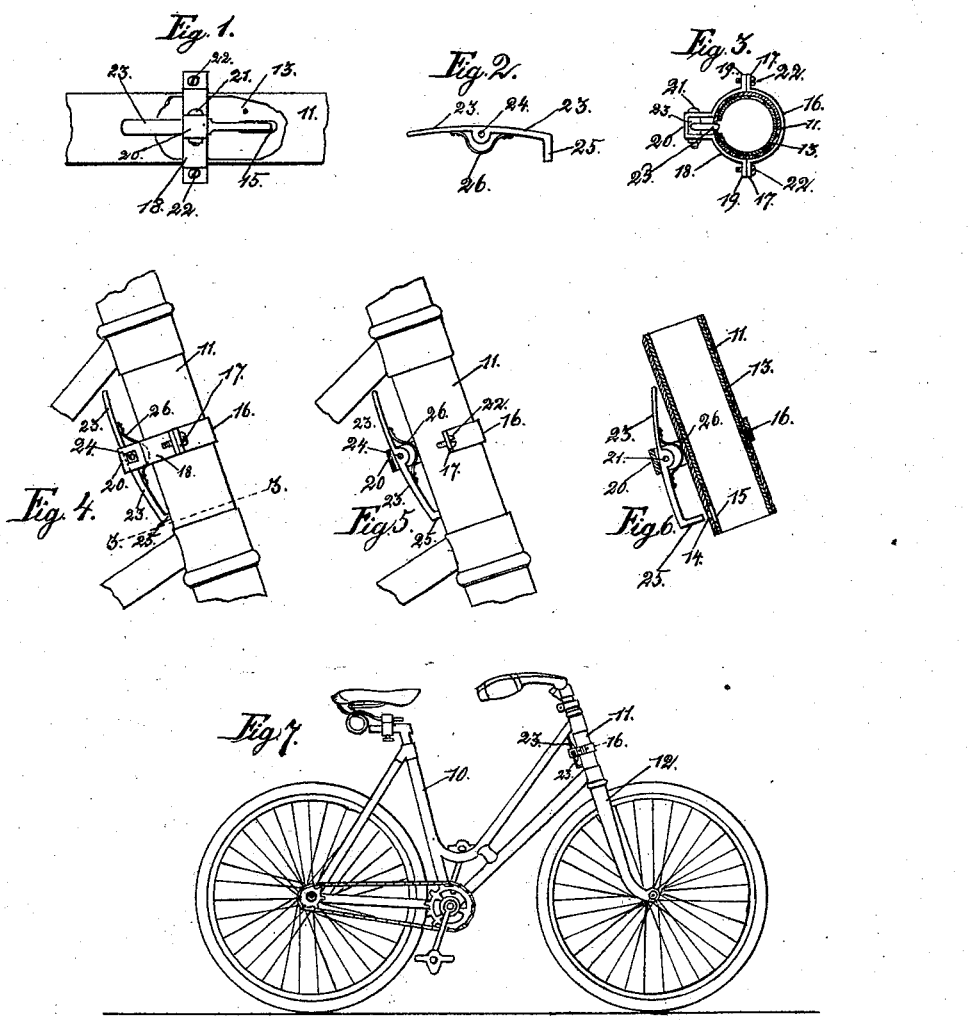

HARRY SIMMONS, OF BOONE, IOWA.

BICYCLE ATTACHMENT.

SPECIFICATION forming part of Letters Patent No. 692,725, dated February 4, 1902.

Application filed September 9, 1901. Serial No. 74,741. (No model.)

*To all whom it may concern:*

Be it known that I, HARRY SIMMONS, a citizen of the United States, residing at Boone, in the county of Boone and State of Iowa, have invented certain new and useful Improvements in Bicycle Attachments, of which the following is a specification.

The object of my invention is to provide a device in the nature of an attachment that may be readily, quickly, and easily applied to any ordinary bicycle, and after it is applied it may be quickly and easily set to position where it will prevent the fork-stem of the steering-wheel from rotating relative to the machine-frame, thereby securing the wheels in alinement with each other, and when the device is set in its inoperative position the wheels may freely turn as required in steering the bicycle, and when in either position the attachment will be prevented from rattling or shaking and will be yieldingly held in position—that is to say, the attachment will remain in any position in which it is placed and cannot be accidentally or inadvertently changed to any other position.

Heretofore in bicycles in which the steering-wheel could not be secured against turning relative to the machine-frame it has been found very difficult to stand a bicycle in a position leaning against a tree, post, or other support, because when a slight shake or jar is given to the machine-frame the front wheel would turn relative to the machine-frame, and hence the machine-frame would fall to the ground. This has been especially true with regard to bicycles having a drop-frame, and it has been very difficult to secure and support bicycles of this class without firmly holding both the front and the rear wheels. Obviously by locking the wheels against turning to a position out of alinement the bicycle may be securely placed in position leaning against a support if any part of the frame or wheels rest against such support.

Another particular advantage to be obtained by the use of my attachment is the promotion of convenience in leading a bicycle, for obviously if the wheels cannot turn to any considerable extent out of the line of advance the bicycle can be led more easily than though the wheels were free to turn in any direction.

My invention consists in certain details in the construction, arrangement, and combination of the various parts of the device whereby the objects contemplated are attained, as hereinafter more fully set forth, pointed out in my claim, and illustrated in the accompanying drawings, in which—

Figure 1 shows an enlarged detail view of a portion of the steering-head with my attachment applied thereto, part of the steering-head being broken away to show adjacent portion of the fork-stem. Fig. 2 shows a side elevation of the locking-bolt detached. Fig. 3 shows a sectional view through the indicated line 3 3 of Fig. 4. Fig. 4 shows a side elevation of the steering-head and adjacent portion of a bicycle-frame with my improvement applied thereto as in practical use. Fig. 5 shows a like view and portion of the clamp for attaching my device to a bicycle-frame being broken away. Fig. 6 shows the steering-head and fork-stem of the bicycle-frame in vertical section, with my attachment applied thereto and in its inoperative position; and Fig. 7 shows a side elevation of a drop-frame bicycle with my improvement applied thereto.

Referring to the accompanying drawings, I have used the reference-numeral 10 to indicate the bicycle-frame proper; 11, the tubular steering-head thereof.

12 indicates the fork of the steering-wheel, and 13 indicates the fork-stem, which is also tubular and passed upwardly through the steering-head and capable of free rotation therein. In the rear surface of the steering-head is a small opening 14, and in the fork-stem is a slightly larger opening 15 so arranged relative to the opening 14 that when the steering-wheel is in alinement with the driving-wheel of the bicycle the said openings 14 and 15 will be in alinement. These openings are, as above indicated, preferably located at the rear surface of said parts; but obviously they may, if desired, be placed in any part of the said portions of the frame.

The device for connecting my attachment with a bicycle comprises a two-part clamp. The one part indicated by the reference-numeral 16 is semicircular in shape and provided with perforated lugs 17 at its ends, and it is designed to overlap the steering-head. The other part of the clamp (indicated by the numeral 18) is of similar general contour and provided with perforated lugs 19 at its ends, and at its central portion is an angular projection 20, transversely bored to receive a screw 21. The two parts of the clamp are adjustable and detachably connected by means of the screw 22, passed through the lugs 17 and 19. Mounted in the angular projection 20 is a lever 23, having an opening 24, through which the screw 21 may be passed, and also having a rounded end portion 25, designed to pass through the openings 14 and 15. Obviously when the said lever is in position it may be manipulated to extend the rounded portion 25 through the openings 14 and 15, or it may be removed from said openings, as desired. In this connection I have provided means of simple and inexpensive construction, whereby the said lever may be yieldingly supported in either position, so that it cannot be shaken loose, and at the same time it will be prevented from rattling in either position, as follows:

The numeral 26 indicates a flat leaf-spring having its ends fixed to the lever 23 at opposite sides of the pivotal point of the lever. The central portion of the spring is arched or bowed and is of such a length that it will engage the steering-head when in position. Obviously when the lever is in position, as shown in Fig. 5, it cannot be withdrawn from the openings 14 and 15 without first compressing the spring and moving it downwardly along the steering-head, and a yielding pressure is applied to the pivotal point of said lever, which will prevent it from rattling. When the lever is moved to the position shown in Fig. 6, the contact-point of the spring on the steering-head obviously passes a dead-center and the lever will be held just as firmly in its open or inoperative position and will also be prevented from rattling in this position.

In practical use it is obvious that the device may be readily, quickly, and easily attached to any ordinary bicycle and may be placed at any point upon the steering-head. Assuming that the operator has dismounted and desires to lean the bicycle against a support, he simply operates the lever 23 to insert the portion 25 in the openings 14 and 15. Then the bicycle-wheels are securely locked in position in alinement with each other, and obviously if any portion of the bicycle frame or wheels is placed against a support the bicycle cannot fall down, because the wheels cannot turn relative to each other. This is, as above indicated, especially advantageous with drop-frame or ladies' bicycles, because in bicycles of this class the only way to lean them against a vertical support is by means of the handles or saddle, and obviously such support is very insecure and the slightest jar or movement of the bicycle will cause it to fall; but with my attachment it is obviated and the bicycle may be easily supported. Furthermore, when it is desired to lead a bicycle the lever is placed in position to lock the fork-stem in the steering-head, and on account of the opening 15 being slightly larger than the opening 14 the fork-stem is permitted a slight rotary movement, sufficient to permit the bicycle to be easily led, and yet prevent the front wheel from turning at too much of an angle relative to the hind wheel.

Having thus described my invention, what I claim, and desire to secure by Letters Patent of the United States therefor, is—

The combination with a bicycle, having an opening in its steering-head and an opening of different size in the fork-stem, said openings being so positioned as to be in alinement when the bicycle-wheels are in alinement, a two-part clamp to encircle the steering-head, a screw for connecting the said parts, a lever fulcrumed to the said clamp and having one end designed to enter both of said openings, and a spring having its ends fixed to the said lever on opposite sides of its fulcrum and having its central portion arched or bowed to yieldingly engage the adjacent portion of the steering-head, substantially as and for the purposes stated.

HARRY SIMMONS.

Witnesses:
GEORGE W. ROE,
H. E. FRY.